United States Patent [19]

Vernor et al.

[11] 4,449,545

[45] May 22, 1984

[54] BREAKAWAY SAFETY VALVE

[76] Inventors: Oliver W. Vernor, 5 Prince Dr., Florissant, Mo. 63034; Arthur M. Brockman, 1906 Brassie Dr., Overland, Mo. 63114

[21] Appl. No.: 339,094

[22] Filed: Jan. 13, 1982

[51] Int. Cl.³ .............................................. F16K 13/04
[52] U.S. Cl. ................................ 137/68 R; 251/149.6; 251/149.9; 285/2
[58] Field of Search ...................... 137/68 R; 285/2, 3; 251/149.6, 149.9

[56] References Cited

U.S. PATENT DOCUMENTS

| | | | |
|---|---|---|---|
| 2,777,716 | 1/1957 | Gray | 251/149.6 X |
| 3,241,521 | 6/1973 | Tatsuno | 137/68 R X |
| 4,060,219 | 11/1977 | Crawford | 251/149.6 |
| 4,070,003 | 1/1978 | Shames | 251/149.6 R |
| 4,119,111 | 10/1978 | Allread | 137/68 R |
| 4,150,809 | 4/1979 | Muller | 251/149.6 X |
| 4,285,533 | 8/1981 | Silberman | 285/2 |
| 4,307,744 | 12/1981 | Marrison | 137/68 R |
| 4,328,822 | 5/1982 | Wilhelm | 137/68 R |

Primary Examiner—Harold W. Weakley
Attorney, Agent, or Firm—Senniger, Powers, Leavitt and Roedel

[57] ABSTRACT

A breakaway safety valve comprising interengageable plug and socket components having a fluid flow passage therethrough, and a plurality of breakaway members holding the plug and socket components in assembly. The breakaway members are adapted to break when the valve is subjected to a force of predetermined magnitude tending to pull the plug and socket components apart thereby to permit separation of the components without damage thereto. At the time of separation, a valve member in the flow passage automatically closes to cut off fluid flow through the passage.

6 Claims, 4 Drawing Figures

U.S. Patent
May 22, 1984
4,449,545
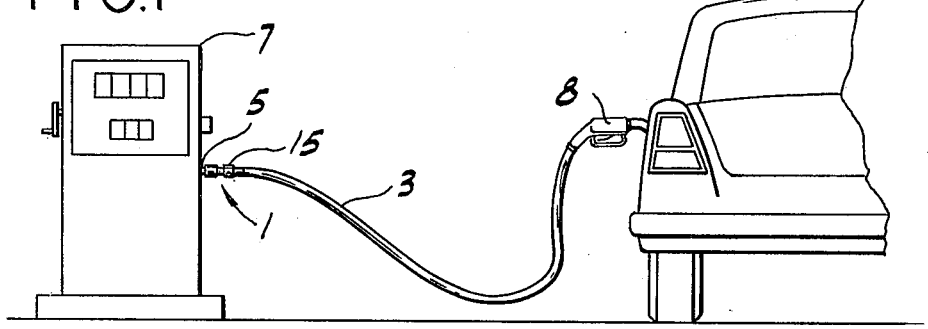
FIG.1
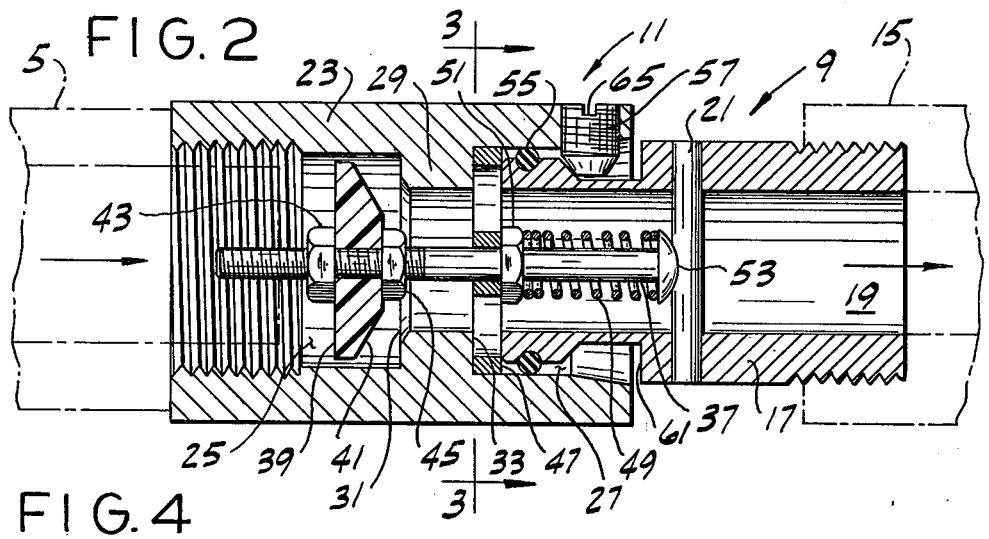
FIG.2
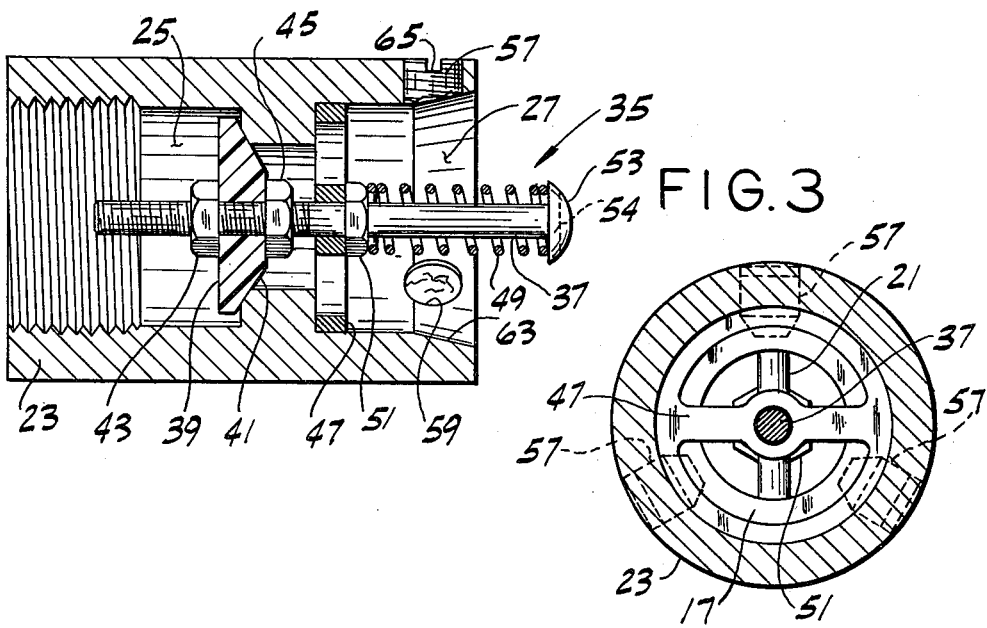
FIG.4
FIG.3

BREAKAWAY SAFETY VALVE

BACKGROUND OF THE INVENTION

The present invention relates generally to valves and more particularly to a breakaway safety valve especially adapted for use in lines which carry flammable fluids, such as gasoline, and which may be subjected to sudden high tensile stresses.

This invention has particular (albeit not exclusive) application to gasoline service stations, especially those of the self-service type, which have been afflicted with the problem of the customer who unwittingly drives off without removing the nozzle from his gasoline tank. This frequently results not only in dangerous gas spillage but also considerable damage to the gas pump. Various breakaway couplings have been used to resolve this problem, such as those shown in U.S. Pat. Nos. 4,064,889, 2,906,280 and 2,898,926. However, these couplings have certain drawbacks, including the fact that the couplings, or the surrounding conduits to which they are attached, are permanently damaged as a result of the breakaway process.

SUMMARY OF THE INVENTION

Among the several objects of the present invention is the provision of an improved breakaway safety valve which is especially suited for connecting lines carrying a flammable fluid and which, when one line is subjected to a sudden stress of sufficient magnitude, is adapted to break away and to cut off fluid flow without damage to either line; the provision of such a valve which is readily repairable after breakaway for reuse; the provision of such a valve which is reliable in use and durable; and the provision of such a valve which is economical to manufacture for reduced cost.

Generally, a breakaway safety valve of the present invention comprises interengageable plug and socket components, the socket component having a fluid flow passage therethrough with inlet and outlet ends, the outlet end forming a chamber receiving said plug component therein, a valve seat in the passage, and a valve member in the passage engageable with the valve seat. The valve member is movable in the passage between a closed position in which it is in sealing engagement with the valve seat to block flow therepast, and an open position in which it is spaced away from the valve seat to permit flow through the passage. Spring means biases the valve member toward its closed position. The plug component is engageable with the valve member for holding it open against the bias of the spring means to permit flow through the passage past the valve seat. Breakaway means holds the plug and socket components in assembly with the plug component received in the socket chamber and engaging the valve member to hold it open. The breakaway means is adapted to break when the valve is subjected to a force of predetermined magnitude tending to pull the plug and socket components apart thereby to permit separation of the components without damage thereto. The valve member, at the time of said separation, is adapted to move in the passage under the bias of the spring means into sealing engagement with the valve seat to cut off flow therepast.

Other objects and features will be in part apparent and in part pointed out hereinafter.

BRIEF DESCRIPTION OF THE DRAWINGS

FIG. 1 is a view showing a valve of the present invention connecting a gasoline hose to a fitting on the side of a gasoline pump;

FIG. 2 is an enlarged longitudinal section through the valve shown in FIG. 1;

FIG. 3 is a transverse section on line 3—3 of FIG. 2; and

FIG. 4 is a view similar to FIG. 2 showing the valve after breakaway.

Corresponding reference characters indicate corresponding parts throughout the several views of the drawings.

DESCRIPTION OF A PREFERRED EMBODIMENT

Referring now to the drawings, and more particularly to FIG. 1, a breakaway safety valve is designated in its entirety by the reference numeral 1 and is shown connecting two parts, in this case a gasoline hose 3 and a fitting 5 on the side of a conventional gas pump or pedestal 7. As will appear in more detail hereinafter, this valve incorporates a unique breakaway feature whereby if a customer drives off with the gas nozzle 8 still in his tank, one portion of the coupling will break away from the pump (thereby avoiding damage to the pump) while the other portion will seal off any flow of gas from the pump to avoid spillage.

As best illustrated in FIG. 2, the valve 1 comprises interengageable plug and socket components indicated at 9 and 11, respectively, the socket component being threaded onto the fitting 5 on the gas pump 7, and the plug component being threaded into a fitting 15 on the hose 3. More specifically, the plug component 9 comprises a tubular plug body 17 having a passage therethrough constituted by an axial bore 19 extending from one end of the plug body to the other. A crosspin 21 is mounted in the plug body and extends diametrically with respect to the passage 19 about midway between its inlet (left) and outlet (right) ends. The outlet end of the plug body is formed with exterior threads for enabling the plug component to be screwed into the hose fitting 15.

The socket component 11 comprises a tubular body 23 having a passage therethrough constituted by a bore 25 extending axially of the body from one end to the other, the bore having inlet (left) and outlet (right) ends with the outlet end forming a chamber 27 for receiving the left end of the plug body 17. The body 23 of the socket is formed with an internal annular shoulder 29 therein having a first face 31 facing generally upstream and providing a valve seat in the passage 25, and a second face 33 facing generally downstream. As shown in FIG. 2, the inside diameter of the socket chamber 27 is substantially larger than the outside diameter of the plug component 9. As will be explained later, the relatively large clearance between the inside diameter of the socket chamber and the outside diameter of the plug component facilitates separation of the plug and socket components. A valve member in the form of a poppet valve, designated generally 35, is mounted for axial movement in passage 25.

As shown in FIGS. 2 and 4, the poppet valve 35 comprises a valve stem 37 having upstream (left) and downstream (right) ends, and sealing means constituted by a sealing member 39 mounted on the upstream end of the valve stem. The valve stem may be constituted by a conventional round-head bolt, for example. The sealing member has a conical surface 41 which, in the event of breakaway, is adapted for sealing engagement with the valve seat 31, the latter being formed with a corresponding bevel to ensure a good seal. A pair of nuts 43, 45 threaded on the upstream end of the valve stem on opposite sides of the sealing member 39 secure the member in fixed position on the stem. Indicated at 47 is a round perforated disk disposed around the valve stem 37 and seated against the downstream face 33 of the annular shoulder 29 in the socket passage 25. A coil compression spring 49 on the valve stem 37 acts at one end against an annular member 51 bearing against the downstream face of this disk 47 and at its other end against abutment means 53 on the downstream (right) end of the valve stem for biasing the poppet valve 35 toward a closed position in which the conical surface 41 of the sealing member 39 seals against the valve seat 31 to block the flow of fluid therepast. In the present embodiment, where the valve stem 37 is constituted by a bolt, the head of the bolt constitutes abutment means 53. The valve stem and abutment means thereon together constitute valve stem means. The poppet valve is held in an open position against the bias of spring 49 by the engagement of the downstream (right) end of the valve stem 37, i.e., bolt head 53, with the crosspin 21 in the plug body 17, the crosspin being received in a slot 54 in the bolt head 53. When in this open position, the sealing member 39 is spaced upstream away from the valve seat 31 for permitting fluid (e.g., gasoline) to flow therepast through the perforations in disk 47 and thence through the passage 19 in the plug body into the hose 3. An O-ring 55 mounted in an external groove in the plug body 17 adjacent its inlet (left) end prevents the leakage of fluid into the annular space between the body 17 of the plug and the body 23 of the socket.

The material out of which the plug and socket components 9, 11 and other parts described above are made will depend on the fluid being handled. In the case of gasoline, for example, the plug and socket bodies 17, 23 may be of brass, the valve stem 37 of aluminum, and the sealing member 39 of neoprene.

In accordance with this invention, breakaway means constituted by a plurality of breakaway members in the form of shear or breakaway pins 57 threaded in radial bores 59 spaced at substantially equal intervals around the socket body 23 are utilized to hold the plug and socket components 9, 11 in assembly, that is, with the plug component 9 received in the socket chamber 27 and with the crosspin 21 engaging the bolt head 53 on the downstream end of the valve stem 37 to hold the poppet valve 35 open. In the preferred embodiment, three such shear pins 57 are shown spaced at 120° intervals around the socket body 23. The pins project radially with respect to the socket passage 25 into the socket chamber and are received in a circular groove 61 in the external surface of the plug body 17 to hold the plug in fixed position in the socket chamber. In this connection, it will be observed that the upstream (left) wall of groove 61 is sloped, the arrangement being such that when the shear pins are threaded into radial bores 59 they engage this wall and force the upstream (left) end of the plug against the disk 47 to ensure a tight fit of the disk against shoulder 29. To prevent rocking of the plug component within socket chamber 27, it is preferred that three shear pins 57 be provided.

The shear pins 57 should be so sized in cross section and of such material that in the event the valve 1 is subjected to a force of predetermined magnitude tending to pull the plug and socket components apart, at least one pin will break (i.e., shear), thereby permitting separation of the components without damage to the coupling other than to the pins. It will be noted in this regard that the force required to cause separation will vary somewhat depending on the angle at which the force is applied to the valve 1. Thus, if the applied force is an axial force directly along the central longitudinal axis of the valve, as would be the case when a customer is extending the hose 3 to put the nozzle 8 in his tank, the force required to cause separation of the plug and socket components 9, 11 is relatively great (e.g., 150 lbs.), since the load is equally distributed over all three pins, and since all three pins would have to shear before the components separated. However, where the force is applied at an angle with respect to the central longitudinal axis of the valve, as would be the case if the customer were to drive off with the nozzle still in the tank, the force required to cause separation would be less (e.g., 50 lbs.), since a disproportionate amount of the load would be carried by one or two of the three pins. Upon the failure of these one or two pins, there is sufficient clearance between the plug component and the wall of the socket chamber 27 to permit separation of the components without failure of the other pin(s).

The shear pins 57 may be of a suitable plastic, for example, such as that made by E. I. DuPont de Nemours and Co. and sold under the trade designation Nylon 101 Type 88 Polypence, or that made by the same company and sold under the trade designation FRPBD DuPont Zytel 101 Nylon Resin. When three shear pins are utilized as illustrated in the drawings, ¼"-diameter pins have been found to be a suitable size.

At the time the plug and socket components 9, 11 separate (see FIG. 4), the poppet valve 35 will move under the bias of spring 49 to bring the sealing member 39 into sealing engagement with the valve seat 31 to cut off the flow of fluid therepast, thereby minimizing any spillage. To facilitate separation of the components, the outlet (right) end of the socket body 23 is internally chamfered as indicated at 63. This ensures that the plug component does not bind in the socket chamber 27 as it is pulled from the socket.

It will be observed, therefore, that in the event a customer drives away from the service station with the gasoline nozzle 8 still in the tank of his car, and assuming that this exerts a pull on the hose 3 (and thus the valve 1) greater than the combined shear strengths of one or two of the breakaway pins 57, the pins will fail and the plug component 9 will be pulled from the socket chamber 27. This in turn will permit the poppet valve 35 to move to its FIG. 4 position to prevent any spillage of gasoline. To reconnect the components 9, 11, the portions of the broken pins remaining in radial bores 59 are simply removed (the pins are slotted as indicated at 65 for easy removal by a screwdriver), the plug component reinserted into the socket chamber 27 to open the poppet valve 35, and new breakaway pins 57 threaded into bores 59 for resecuring the plug and socket components in assembly. Thus, unlike the prior art devices discussed hereinabove, the coupling of the present invention is reusable.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A breakaway safety valve comprising interengageable plug and socket components, the socket component having a fluid flow passage therethrough with inlet and outlet ends, the outlet end forming a chamber for receiving said plug component therein, a valve seat in the passage, a valve member in the passage engageable with the valve seat, the valve member being movable in the passage between a closed position in which it is in sealing engagement with the valve seat to block flow therepast, and an open position in which it is spaced away from the valve seat to permit flow through the passage, spring means biasing the valve member toward its closed position, said plug component being engageable with the valve member for holding it open against the bias of said spring means to permit flow through the passage past the valve seat, and breakaway means holding the plug and socket components in assembly with the plug component received in said chamber and engaging the valve member to hold it open, said breakaway means being adapted to break when the valve is subjected to a force of predetermined magnitude tending to pull the plug and socket components apart thereby to permit separation of the components without damage thereto, said valve member, at the time of said separation, being adapted to move in the passage under the bias of said spring means into sealing engagement with the valve seat to cut off flow therepast, said plug component having an outside diameter substantially smaller than the inside diameter of said socket chamber to provide a relatively large clearance therebetween, and the outlet end of said socket component being internally chamfered, said chamfer and clearance being sufficiently large relative to the distance which the plug component extends into the socket component to permit withdrawal of the plug component from the socket component without substantial damage to either component when an angular non-axial force is applied to the plug component, said plug component comprising a tubular plug body having inlet and outlet ends and an axial passage therethrough, said plug body having an external circular groove therein, said breakaway means comprising three shear pins threaded in radial bores spaced at intervals around the socket body, each pin projecting into said socket chamber and into said external circular groove in the tubular plug body to hold the latter in fixed position in said socket chamber, said valve member comprising valve stem means having upstream and downstream ends, and sealing means on the upstream end of the valve stem means engageable with said valve seat when the valve member is in its closed position, the downstream end of the valve stem means extending into said socket chamber and being engageable by said plug component, said socket component comprising a tubular body having an internal annular shoulder therein, said shoulder having a first face facing generally upstream and forming said valve seat, and a second face facing generally downstream, said valve stem means comprising a valve stem and abutment means on the downstream end of the valve stem, and a perforated disk around the valve stem seated against the downstream face of said internal annular shoulder, said spring means being constituted by a coil compression spring on the valve stem between said disk and said abutment means for biasing the valve member toward its closed position, said sealing means comprising a sealing member on the upstream end of the valve stem.

2. A valve as set forth in claim 1 wherein said breakaway member is removably mounted in the socket component whereby after breakage of the member, it may be readily replaced by an unbroken breakaway member to permit reuse of the coupling.

3. A valve as set forth in claim 1 wherein each shear pin is slotted for enabling it to be threaded into and out of said radial bore by means of a screwdriver or the like.

4. A valve as set forth in claim 1 wherein said breakaway member is of synthetic resin material.

5. A valve as set forth in claim 4 wherein said breakaway member is of nylon.

6. A valve as set forth in claim 1 wherein said plug component further comprises a crosspin mounted in the plug body extending diametrically with respect to the plug passage, the downstream end of said valve stem means engaging said crosspin for holding the valve member in its open position.

* * * * *